US006985600B2

(12) United States Patent
Rhoads et al.

(10) Patent No.: US 6,985,600 B2
(45) Date of Patent: Jan. 10, 2006

(54) PRINTING MEDIA AND METHODS EMPLOYING DIGITAL WATERMARKING

(75) Inventors: Geoffrey B. Rhoads, West Linn, OR (US); Aruna B. Kumar, Camas, WA (US); Trent J. Brundage, Tigard, OR (US); Brett T. Hannigan, Portland, OR (US); Tony F. Rodriguez, Portland, OR (US); J. Scott Carr, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 647 days.

(21) Appl. No.: 09/811,366

(22) Filed: Mar. 15, 2001

(65) Prior Publication Data

US 2002/0018579 A1 Feb. 14, 2002

Related U.S. Application Data

(63) Continuation-in-part of application No. 09/803,167, filed on Mar. 9, 2001, and a continuation-in-part of application No. 09/689,289, filed on Oct. 11, 2000, which is a continuation-in-part of application No. 09/640,806, filed on Aug. 17, 2000, now Pat. No. 6,438,231, and a continuation-in-part of application No. 09/633,587, filed on Aug. 7, 2000, and a continuation-in-part of application No. 09/631,409, filed on Aug. 3, 2000, and a continuation-in-part of application No. 09/629,401, filed on Aug. 1, 2000, now Pat. No. 6,522,770, and a continuation-in-part of application No. 09/619,264, filed on Jul. 19, 2000, and a continuation-in-part of application No. 09/571,422, filed on May 15, 2000, and a continuation-in-part of application No. 09/562,524, filed on May 1, 2000, now Pat. No. 6,724,912, which is a continuation-in-part of application No. 09/562,516, filed on May 1, 2000, which is a continuation-in-part of application No. 09/553,112, filed on Apr. 20, 2000, now abandoned, which is a continuation-in-part of application No. 09/498,223, filed on Feb. 3, 2000, now Pat. No. 6,574,350, which is a continuation of application No. 09/433,114, filed on Nov. 3, 1999, now Pat. No. 6,636,615, which is a continuation-in-part of application No. 09/343,104, filed on Jun. 29, 1999, now abandoned, which is a continuation-in-part of application No. 09/314,648, filed on May 19, 1999, now Pat. No. 6,681,028, which is a continuation-in-part of application No. 09/287,940, filed on Apr. 7, 1999, now Pat. No. 6,580,819, which is a continuation-in-part of application No. 09/234,780, filed on Jan. 20, 1999, now abandoned, which is a continuation-in-part of application No. 09/127,502, filed on Jul. 31, 1998, now Pat. No. 6,345,104, which is a continuation-in-part of application No. 08/967,693, filed on Nov. 12, 1997, now Pat. No. 6,122,392, which is a continuation of application No. 08/614,521, filed on Mar. 15, 1996, now Pat. No. 5,745,604, which is a continuation of application No. 08/215,289, filed on Mar. 17, 1994, now abandoned.

(60) Provisional application No. 60/131,005, filed on Apr. 22, 1999, provisional application No. 60/082,228, filed on Apr. 16, 1998, and provisional application No. 60/071,983, filed on Jan. 20, 1998.

(51) Int. Cl.
*H04K 1/00* (2006.01)

(52) U.S. Cl. .......................... 382/100; 283/72

(58) Field of Classification Search ................ 382/100, 382/232; 380/51, 54, 55; 713/176; 358/3.28; 283/72, 75, 77, 85, 93, 113, 901, 902
See application file for complete search history.

(56) References Cited

U.S. PATENT DOCUMENTS

| | | | |
|---|---|---|---|
| 3,676,646 A | | 7/1972 | Carlsen et al. ....... 235/61.12 N |
| 3,977,785 A | | 8/1976 | Harris .................... 355/133 |
| 5,139,339 A | | 8/1992 | Courtney et al. ........... 356/446 |
| 5,257,351 A | | 10/1993 | Leonard et al. ............. 395/150 |
| 5,414,781 A | | 5/1995 | Spitz et al. ................. 382/296 |
| 5,471,533 A | * | 11/1995 | Wang et al. ................. 380/51 |
| 5,495,581 A | | 2/1996 | Tsai .......................... 395/154 |
| 5,500,715 A | | 3/1996 | Ta et al. .................... 355/204 |
| 5,534,890 A | | 7/1996 | Krug et al. ................. 346/100 |
| 5,659,628 A | | 8/1997 | Tachikawa et al. ......... 382/135 |
| 5,680,455 A | | 10/1997 | Linsker et al. ............... 380/18 |
| 5,745,604 A | | 4/1998 | Rhoads ...................... 382/232 |
| 5,752,152 A | | 5/1998 | Gasper et al. .............. 399/366 |
| 5,765,176 A | | 6/1998 | Bloomberg ................. 707/514 |
| 5,772,250 A | * | 6/1998 | Gasper ...................... 283/114 |
| 5,790,703 A | | 8/1998 | Wang ......................... 382/212 |

(Continued)

FOREIGN PATENT DOCUMENTS

| | | | |
|---|---|---|---|
| DE | 29 43 436 A1 | * | 5/1981 |
| EP | 493091 A1 | | 7/1992 |
| WO | WO 98/56596 A1 | * | 12/1998 |
| WO | WO00/70585 A1 | | 11/2000 |

OTHER PUBLICATIONS

Guido, "Preventing Copying of Classified Information," *IBM Technical Disclosure Bulletin*, vol. 19, No. 4, Sep. 1974, pp 1469–1470.*

Haslop, "Security Printing Techniques," *Optical Document Security*, Artech House, Inc., 1994, pp. 111–126.* van Renesse, "3DAS: A 3Dimensional–Structure Authentication System," *Proc. European Convention on Security and Detection*, May 1995, pp. 45–49.*

Applicant statement re 1999 customer proposal.

Applicant statement re digitally watermarked corporate stationery.

U.S. Appl. No. 09/619,264, filed Jul. 2000, Kumar.

*Primary Examiner*—Andrew W. Johns
(74) *Attorney, Agent, or Firm*—Digimarc Corporation

(57) ABSTRACT

Stationery, or other printable media, is encoded with a digital watermark. The watermark is not conspicuous to a human observer of the media, yet conveys plural bits of auxiliary information when optically scanned and digitally processed. The watermark can be formed by ink-jet printing, or otherwise. The encoded information can be used for various purposes, including authenticating the document as an original, linking to associated on-line resources, and distinguishing seemingly-identical versions of the same document (document serialization).

50 Claims, 8 Drawing Sheets

U.S. PATENT DOCUMENTS

| | | | | |
|---|---|---|---|---|
| 5,801,722 A | | 9/1998 | Ueda et al. | 347/16 |
| 5,813,333 A | | 9/1998 | Ohno | 101/181 |
| 5,822,436 A | | 10/1998 | Rhoads | 380/54 |
| 5,832,119 A | | 11/1998 | Rhoads | 382/232 |
| 5,838,458 A | | 11/1998 | Tsai | 358/402 |
| 5,838,814 A | * | 11/1998 | Moore | 382/115 |
| 5,841,978 A | | 11/1998 | Rhoads | 395/200.47 |
| 5,848,155 A | | 12/1998 | Cox | 380/4 |
| 5,850,481 A | | 12/1998 | Rhoads | 382/232 |
| 5,862,260 A | | 1/1999 | Rhoads | 382/232 |
| 5,871,615 A | | 2/1999 | Harris | 162/140 |
| 5,919,730 A | * | 7/1999 | Gasper et al. | 503/201 |
| 5,978,773 A | | 11/1999 | Hudetz et al. | 705/23 |
| 6,084,528 A | | 7/2000 | Beach et al. | 340/825.35 |
| 6,106,166 A | | 8/2000 | Spurr et al. | 396/578 |
| 6,111,954 A | | 8/2000 | Rhoads | 380/54 |
| 6,122,392 A | | 9/2000 | Rhoads | 382/100 |
| 6,243,480 B1 | | 6/2001 | Zhao et al. | 382/100 |
| 6,246,776 B1 | | 6/2001 | Merz et al. | 382/100 |
| 6,276,771 B1 | | 8/2001 | Kim et al. | 347/3 |
| 6,291,829 B1 | | 9/2001 | Allen et al. | 250/559.07 |
| 6,297,873 B1 | | 10/2001 | Furuya | 355/40 |
| 6,318,827 B1 | | 11/2001 | Brenner et al. | 347/9 |
| 6,345,104 B1 | | 2/2002 | Rhoads | 382/100 |
| 6,353,479 B1 | | 3/2002 | Lubawy et al. | 358/1.13 |
| 6,438,231 B1 | | 8/2002 | Rhoads | 380/59 |
| 6,442,285 B2 | | 8/2002 | Rhoads et al. | 382/100 |
| 6,522,770 B1 | | 2/2003 | Seder et al. | 382/100 |
| 6,574,350 B1 | | 6/2003 | Rhoads et al. | 382/100 |
| 6,580,819 B1 | | 6/2003 | Rhoads | 382/135 |
| 6,608,919 B1 | | 8/2003 | Alattar | 382/135 |
| 6,614,914 B1 | | 9/2003 | Rhoads et al. | 382/100 |
| 6,636,615 B1 | | 10/2003 | Rhoads et al. | 382/100 |
| 6,681,028 B2 | | 1/2004 | Rodriguez et al. | 382/100 |
| 6,724,912 B1 | | 4/2004 | Carr et al. | 382/100 |
| 2001/0006585 A1 | | 7/2001 | Horigane | 400/70 |
| 2001/0037455 A1 | | 11/2001 | Lawandy et al. | 713/176 |
| 2002/0085759 A1 | | 7/2002 | Davies et al. | 382/203 |
| 2002/0126871 A1 | | 9/2002 | Hannigan et al. | 382/100 |

* cited by examiner

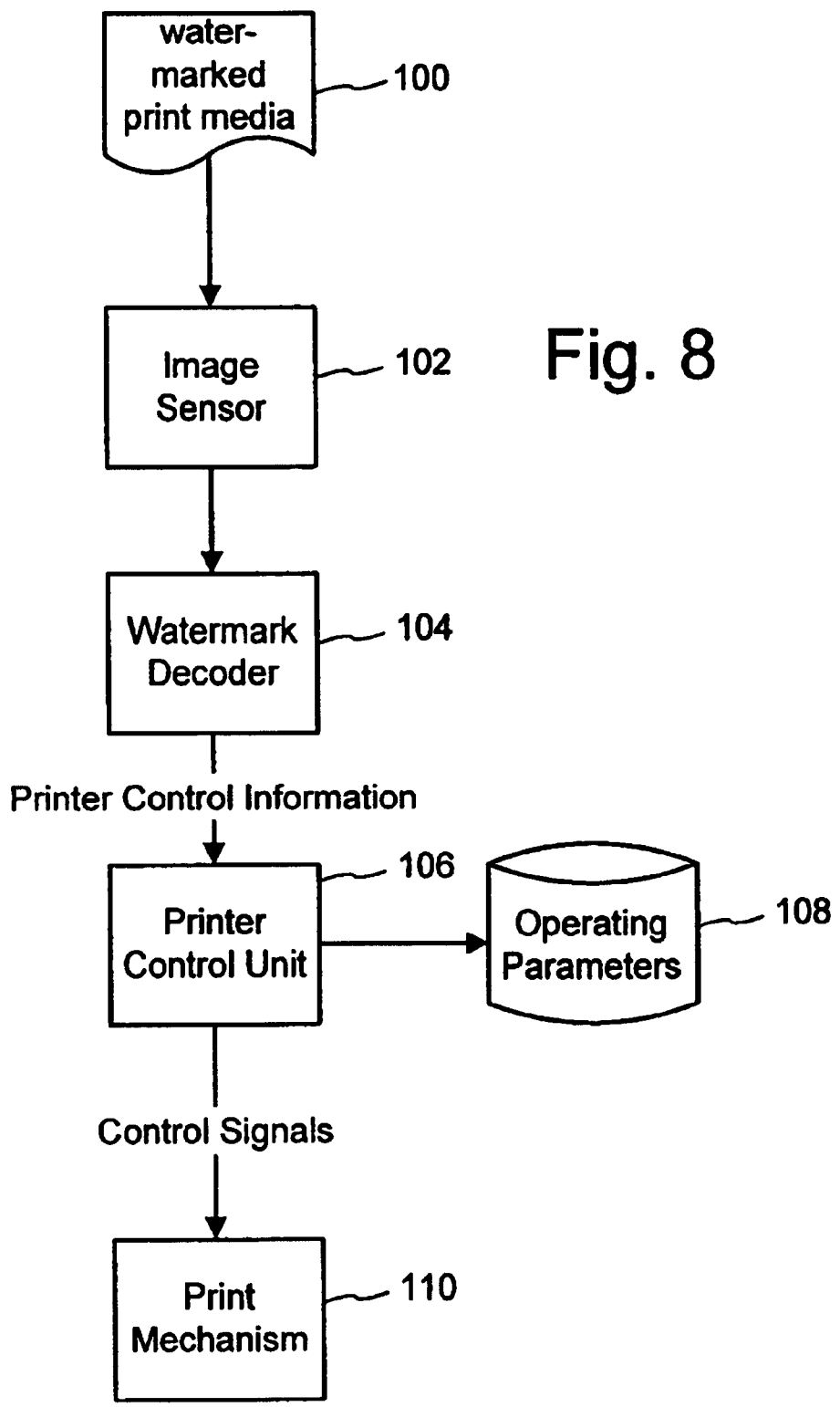

PRINTING MEDIA AND METHODS EMPLOYING DIGITAL WATERMARKING

RELATED APPLICATION DATA

The present application is a continuation-in-part of each of the following applications:

Ser. No. 09/127,502, filed Jul. 31, 1998 (now U.S. Pat. No. 6,345,104), which is a continuation-in-part of Ser. No. 08/967,693, filed Nov. 12, 1997 (now U.S. Pat. No. 6,122,392), which is a continuation of Ser. No. 08/614, 521, filed Mar. 15, 1996 (now U.S. Pat. No. 5,745,604), which is a continuation of Ser. No. 08/215,289, filed Mar. 17, 1994, now abandoned;

Ser. No. 09/498,223, filed Feb. 3, 2000 (now U.S. Pat. No. 6,574,350), which is a continuation in part of Ser. No. 09/287,940, filed Apr. 7, 1999 (now U.S. Pat. No. 6,580,819), which claims priority to Ser. No. 60/082, 228, filed Apr. 16, 1998; the 09/498,223 application is also a continuation Ser. No. 09/433,104, filed Nov. 3, 1999 (now U.S. Pat. No. 6,636,615), which is a continuation in part of Ser. No. 09/234,780, filed Jan. 20, 1999 (abandoned), which claims priority to application Ser. No. 60/071,983 filed Jan. 20, 1998;

Ser. No. 09/553,112, filed Apr. 20, 2000 (attached as Appendix D, now abandoned), which claims priority from application Ser. No. 60/131,005, filed Apr. 22, 1999;

Ser. No. 09/562,516, filed May 1, 2000 (attached as Appendix E)

Ser. No. 09/562,524, filed May 1, 2000 (now U.S. Pat. No. 6,724,912);

Ser. No. 09/571,422, filed May 15, 2000 (international counterpart published as WO00/70585);

Ser. No. 09/619,264, filed Jul. 19, 2000 (attached as Appendix H);

Ser. No. 09/629,401, filed Aug. 1, 2000 (now U.S. Pat. No. 6,522,770);

Ser. No. 09/631,409, filed Aug. 3, 2000 (attached as Appendix J);

Ser. No. 09/633,587, filed Aug. 7, 2000, which is a continuation-in-part of Ser. No. 09/343,104, filed Jun. 29, 1999 (abandoned), which is a continuation-in-part of Ser. No. 09/314,648, filed May 19, 1999 (now U.S. Pat. No. 6,681,028).

Ser. No. 09/640,806, filed Aug. 17, 2000 (now U.S. Pat. No. 6,438,231);

Ser. No. 09/689,289, filed Oct. 11, 2000 (attached as Appendix K), which is a continuation-in-part of Ser. No. 09/567,405, filed May 8, 2000;

Ser. No. 09/803,167, filed Mar. 9, 2001 (now published as US 20020126871).

Claims directed to blank paper media have earlier issued to the present assignee in U.S. Pat. Nos. 5,850,481, 5,822, 436, and 6,111,954, and have been indicated as allowable (subject to Terminal Disclaimer) in application Ser. No. 09/640,806 (now U.S. Pat. No. 6,438,231).

FIELD OF THE INVENTION

The present invention relates to steganographic encoding of substrates—such as blank paper, wherein the encoding is not apparent or conspicuous to human observers, yet is detectable by visible light scanning of the media.

BACKGROUND AND SUMMARY OF THE INVENTION

In a great variety of applications, it is desirable for documents and other substrates to convey digital information.

Printed bar codes are one way of encoding digital data on documents, but bar codes are unsuited for many applications due to aesthetics etc. Magnetic stripes can be used in some circumstances, but again the stripe is conspicuous, and reading the stripe requires a reader device that is not generally available. Radio frequency ID (RFID) is another technology that is sometimes used, but the cost is prohibitive for most applications, and specialized readers are again required.

For those situations in which the marking needs to be both inconspicuous and low cost, digital watermarking offers a promising alternative. Digital watermarking involves making subtle changes to a substrate's appearance (e.g., by ink speckling, texturing, background printing, or other techniques detailed in the literature)—changes that generally pass unnoticed by human viewers but that can be sensed by optical techniques (e.g., webcams, scanners, digital cameras) and decoded by computer processing of the resulting image data to extract the encoded information application Ser. No. 09/503,881 (now U.S. Pat. No. 6,614,914) details illustrative watermark encoding/decoding technology. A great number of other techniques are known to artisans in the field, and can be alternatively used. (The following specification commonly uses the term "watermarking" as shorthand for "digital watermarking." This steganographic form of digital data encoding is different than the paper watermarks that have, for centuries, been used in certain documents.)

The present assignee has filed many patent applications that have dealt with digital watermarking of paper and other substrates. The present application serves to compile these various works into a consolidated filing.

Application Ser. No. 09/640,806 (now U.S. Pat. No. 6,438,231), with priority back to application Ser. No. 08/215,289, filed Mar. 17, 1994 (through intervening U.S. Pat. Nos. 5,822,436 and 6,111,954) teaches that blank photographic paper and photographic film can be pre-processed—before exposure—to encode digital watermark information. When the paper/film is thereafter developed, the encoded information permeates the exposed image. That application also discusses substrate texturing as a way of effecting digital watermarking.

Application Ser. No. 09/127,502 (now U.S. Pat. No. 6,345,104) teaches how a watermark pattern can be formed in the background of a printed document, such as by speckling small droplets of ink, or printing a mesh or weave of very thin lines. Ink-jet, intaglio, offset litho, letterpress, xerography, and other printing processes can be used. Such printing can be used to impart a tint to paper while simultaneously encoding auxiliary data (the watermark payload). Watermark encoding by texturing, such as by use of embossing pressure rollers or intaglio plates, is also discussed. Such processes can be performed by the end-user of the paper, or earlier, e.g., by a paper manufacturer. Moreover, they can be applied to the base substrate, or to a laminate layer (which may be clear) that is applied to the base substrate. The background patterning can encode both the auxiliary data payload, and calibration/orientation information that helps the decoder determine (and compensate for) rotation or scaling of the scan data prior to decoding. The encoding can extend across the entire document/substrate, or can be restricted to certain areas.

Application Ser. No. 09/562,524 (now U.S. Pat. No. 6,724,912) particularly considers watermarking of laminate layers and synthetic substrates by techniques including opacification, laser ablation and cutting, and gravure printing. This application also considers how a single sheet of blank media can be encoded to convey different watermarks in different regions.

Application Ser. No. 09/562,516 details a variety of techniques for digitally encoding blank media, including printing watermark patterns with inks whose spectral response extends into UV or IR, and printing with combinations of inks. This application also recognizes that the selection of inks can be tailored to the spectra of expected illumination sources.

Application Ser. No. 09/553,112 details how particular line patterns can be designed to encode desired digital watermark information on documents and substrates. According to one method, a watermark tile is first defined—specifying luminance values in different regions. Lines are then formed between different areas in accordance with the values in the watermark tile.

Application Ser. Nos. 09/571,422 and 09/633,587 detail how a printed document, such as a business card, greeting card, product packaging, postal mail, catalog, magazine, credit card, office document, driver's license, book jacket, event ticket, etc., can be encoded with a digital watermark that corresponds to an electronic address. When presented to an imaging system, such as a webcam-equipped computer or other device, the resulting image data is processed to decode the watermark. The device then establishes a link to the electronic address in order to provide the user with additional information or content related to the original document, or to trigger an associated action. (The electronic address can be literally encoded in the watermark. More commonly, however, the watermark encodes an identifier. After detection, the decoding device uses this identifier to access a data structure, such as a remote database, to obtain a corresponding address.) These applications also contemplate that the encoding can be applied to blank media, such as blank magazine paper stock, and blank Post-It brand adhesive note pages. After end use by a consumer, the encoding persists, permitting linking or other watermark-based functionality.

Application Ser. No. 09/631,409 expands on the foregoing—particularly considering systems that link from invoices, bank statements and checks, and other account paperwork to associated on-line resources. By such arrangements, consumers can review billing history, make electronic payments, correspond with the banking or commercial institution, print completed checks, etc.

Applications Ser. No. 09/498,223 (now U.S. Pat. No. 6,574,350) and Ser. No. 09/433,104 (now U.S. Pat. No. 6,636,615) detail "fragile" digital watermarks, i.e., watermarks that are designed to be lost, or to degrade in a predictable manner, when subject to certain forms of processing (e.g., scanning and printing, or photocopying). A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations. Fragile watermarks can be combined with more traditional, "robust" watermarks within a single document. The former serves to authenticate the document as an original. The latter serves to tag the document with a persistent set of auxiliary data (which can be used for any of the purposes for which watermarks are used).

Application Ser. No. 09/689,289 details particular applications of document watermarking in fields relating to stationary, postal mail and postage. Exemplary applications include document serialization, authentication, copy-control, envelope franking, internet linking, encoding of delivery address information, etc. Again, watermarking of blank printing stock is contemplated. Large lots of documents can be watermarked with the same data payload, or each sheet can convey a unique watermark payload. Corporate stationary can be marked with a fragile watermark to permit a genuine document to be distinguished from a photocopy or other reproduction.

Application Ser. No. 09/619,264 details that printers (including fax machines, photocopiers, etc.) can include optical sensors and decode watermark information from blank paper stock. This watermark can signal to the printer the particular type of paper about to be printed (e.g., glossy photo stock, corporate letterhead, etc.). The printer can then tailor its printing attributes in accordance with the particular paper being printed. The substrate watermark can be implemented using a variety of techniques, including clear inking.

Application Ser. No. 09/629,401 (now U.S. Pat. No. 6,522,770) details how office documents, such as printed spreadsheets, can include a background (or other) watermark pattern. When presented to a webcam, or other such device, an associated computer can decode the watermark and, from this information, identify where the document is stored. The document can then be loaded from such storage, and a corresponding program launched to permit on-screen review or editing. Meta-data associated with the document can also be recalled by reference to the watermark. The encoding of the watermark in the printed output can be effected transparently to the user, such as by the application program (Excel), by printer driver software, or by the printer itself.

Application Ser. No. 09/803,167, filed Mar. 9, 2001 (now published as US 20020126871) details how a substrate can be treated so that, when printed with unwatermarked text or imagery, the resulting document will be watermarked. This can be done, e.g., by locally tailoring the ink absorption attributes of different regions on the page, such as by a finely patterned waxy coating.

BRIEF DESCRIPTION OF THE DRAWINGS

FIG. 8 is a block diagram illustrating a printer architecture that reads digital watermarks to obtain printer control information.

DETAILED DESCRIPTION

Figure 1:
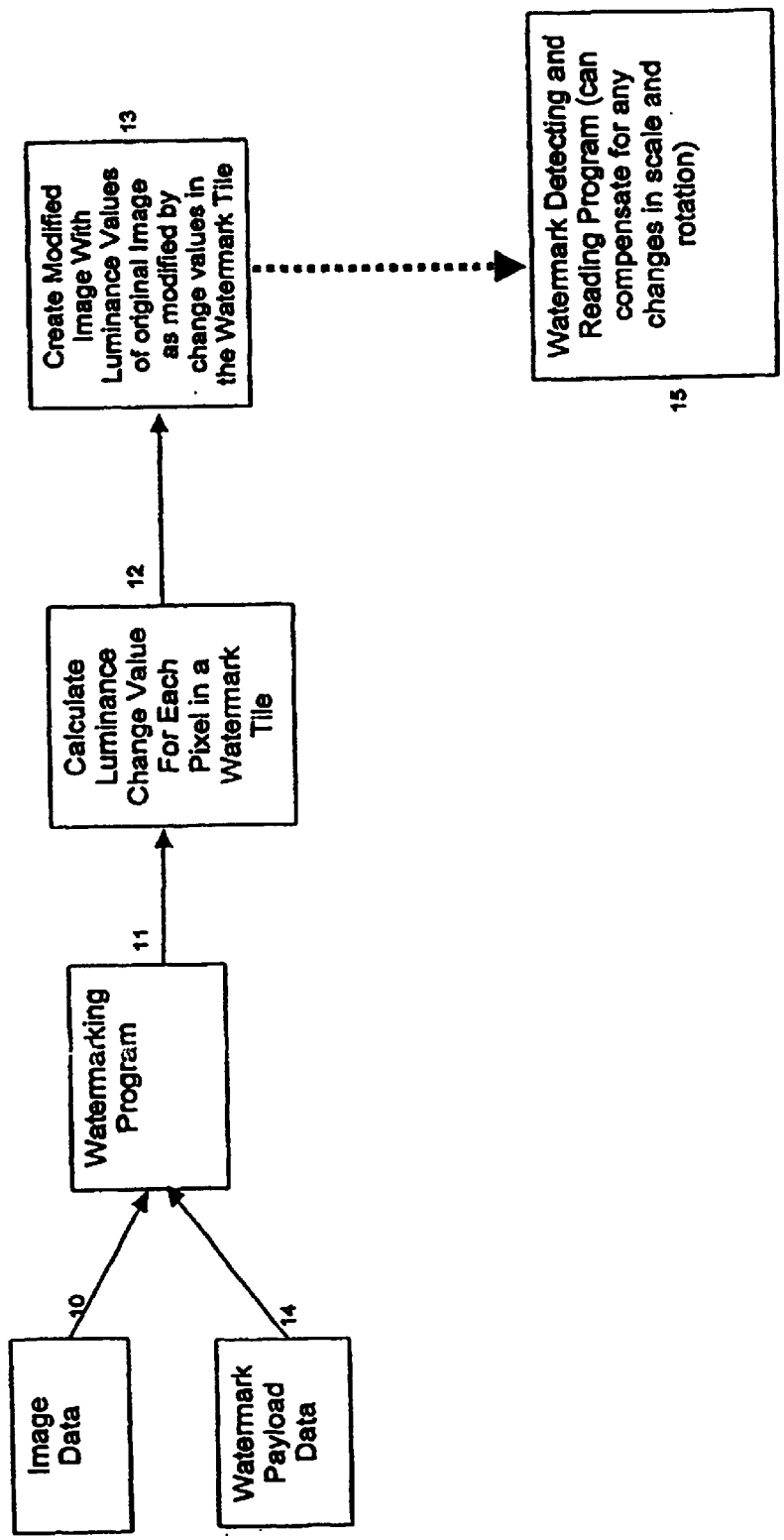
FIG. 1 shows a prior art watermarking system.
Figure 2:
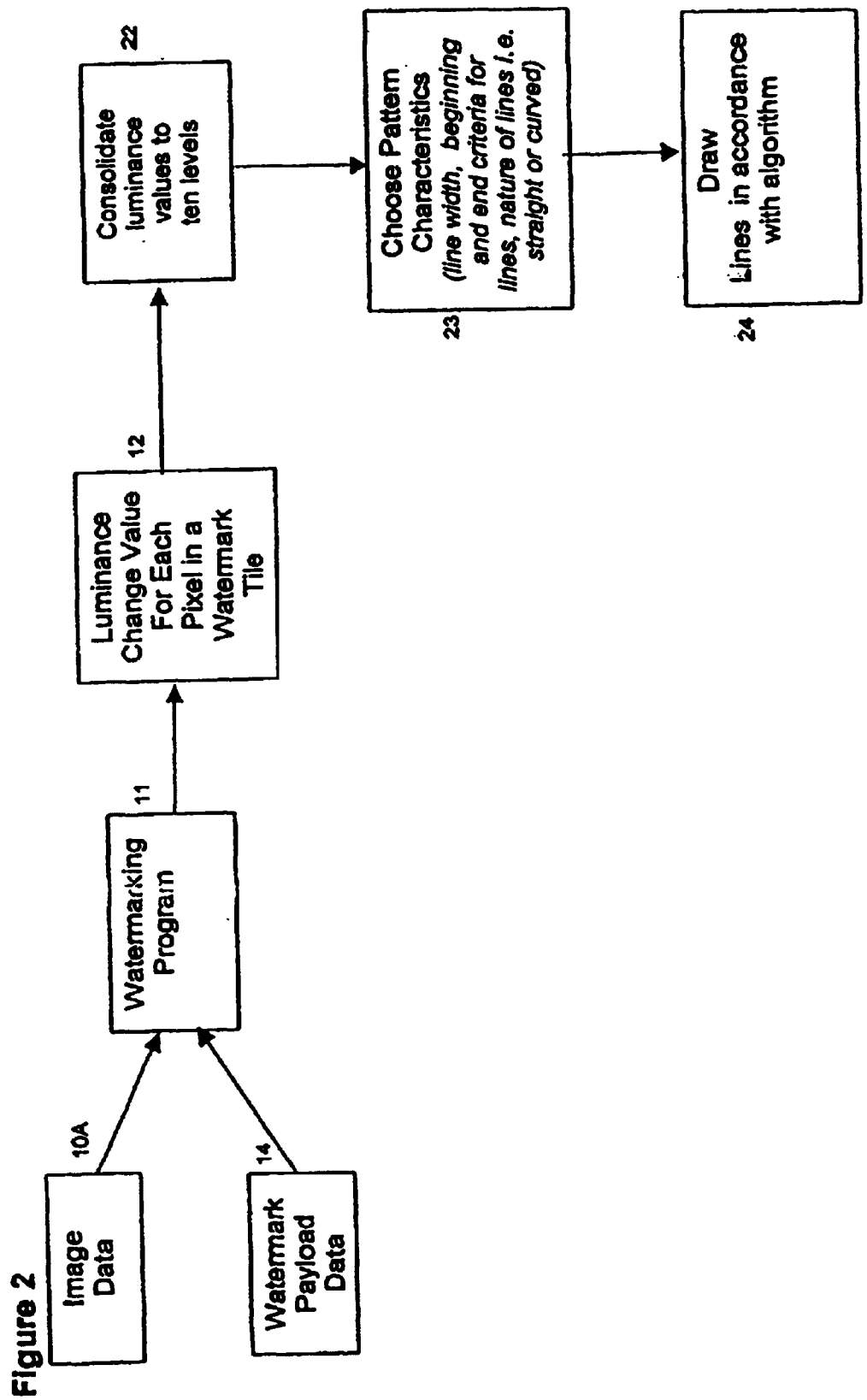
FIG. 2 is an overall system diagram of the present invention.
Figure 3:
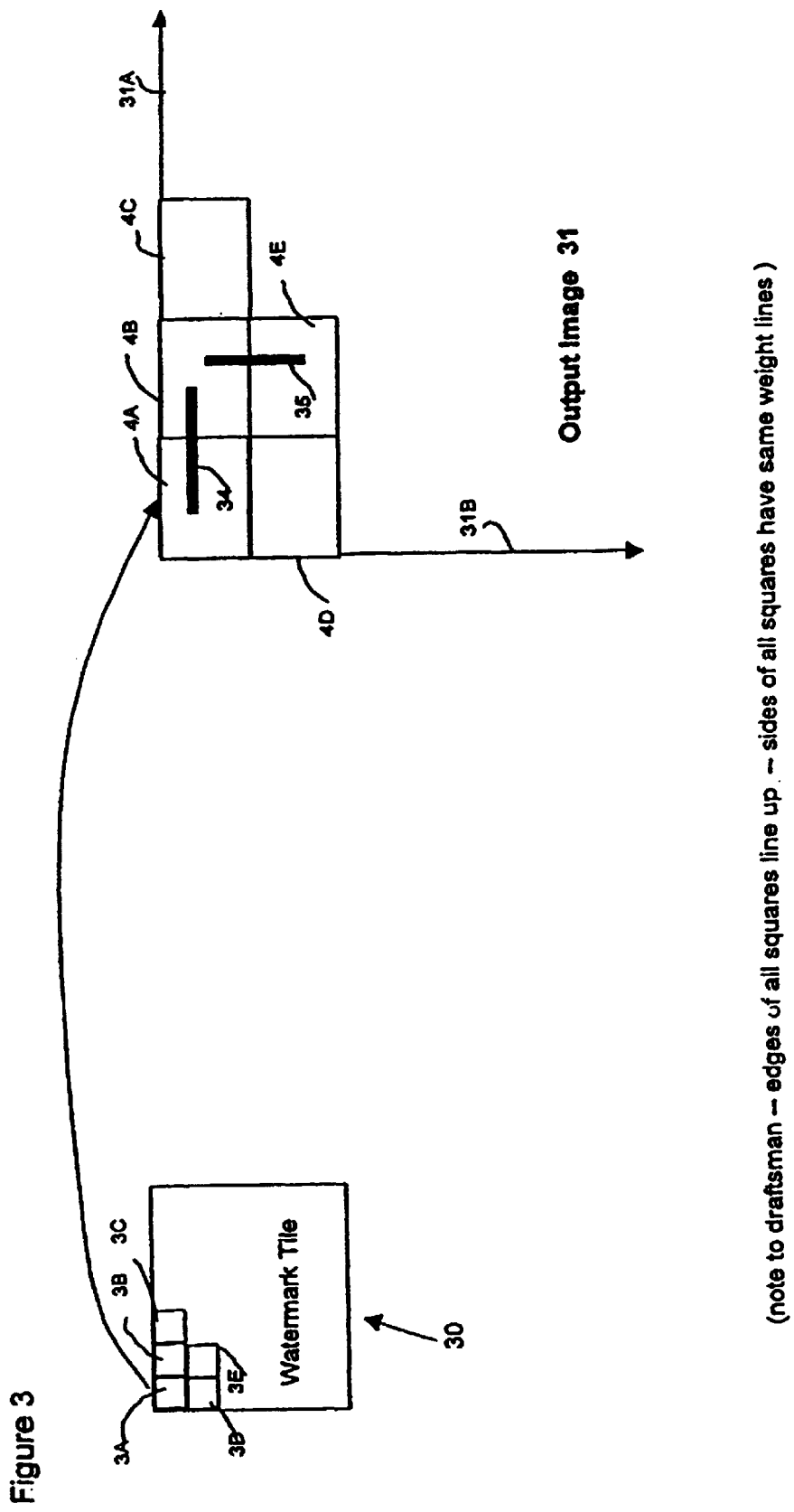
FIG. 3 illustrates the correspondence between the luminance values in a watermark tile and areas in the output image.
Figure 4:
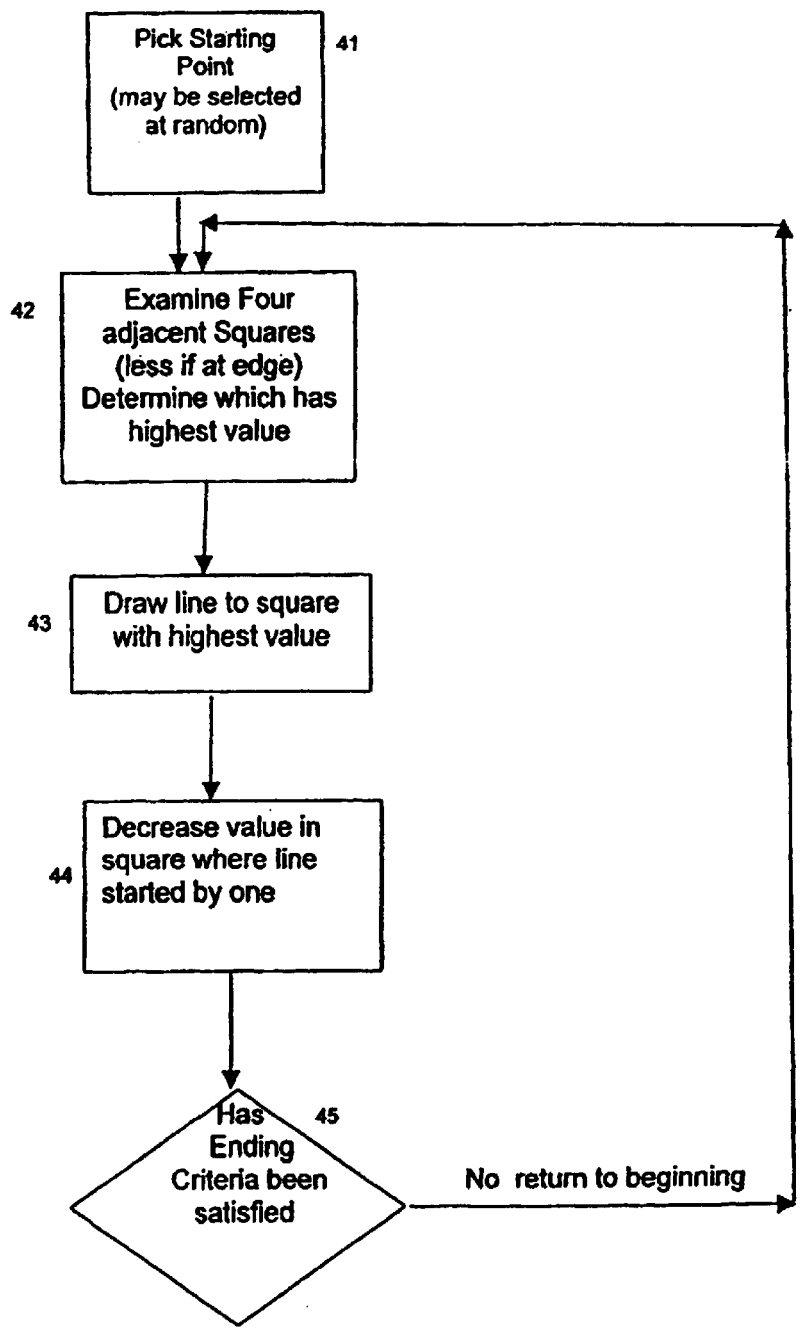
FIG. 4 is a flow diagram of the present invention.
Figure 5:
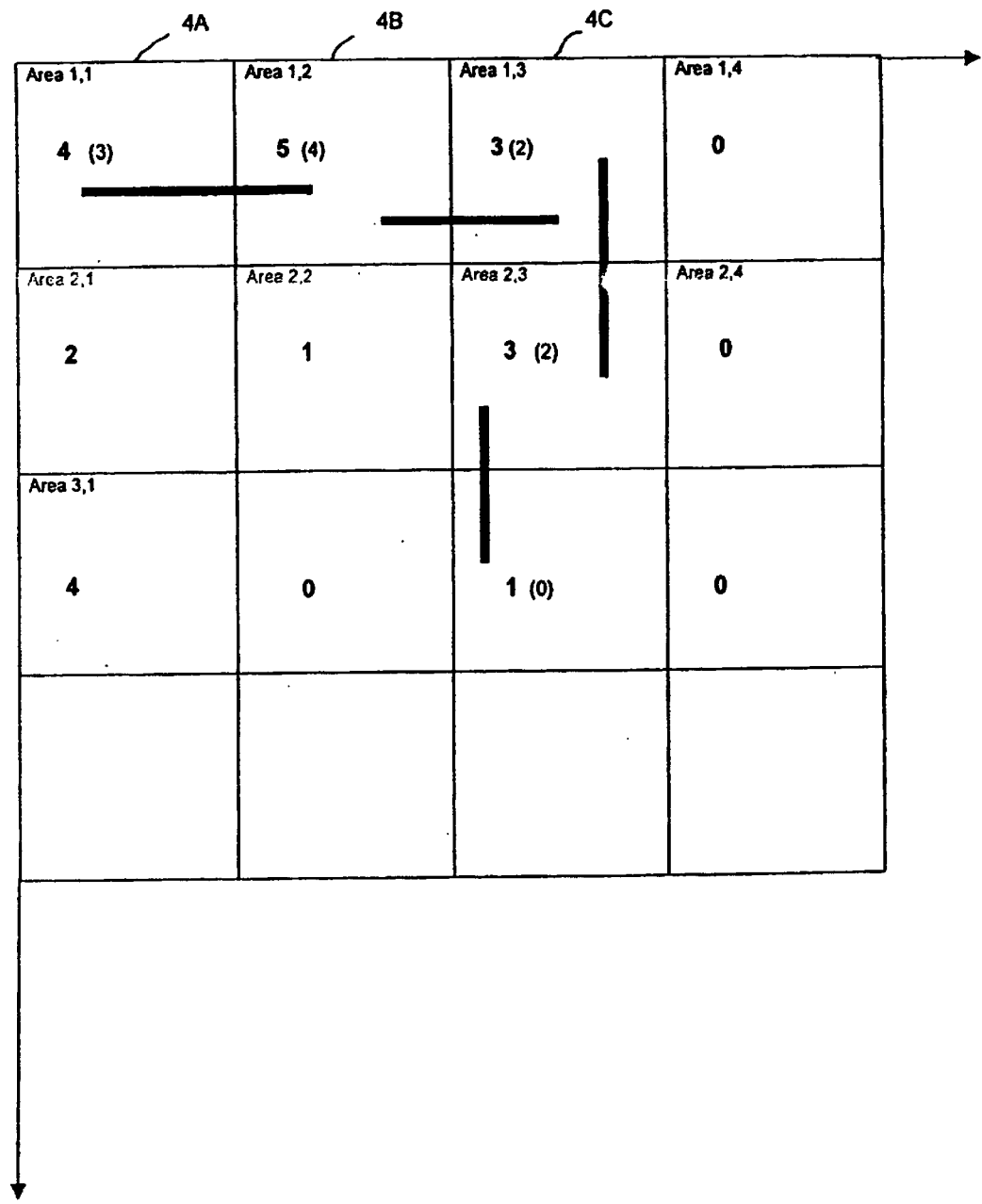
FIG. 5 shows the lines in an output image.
Figure 6:
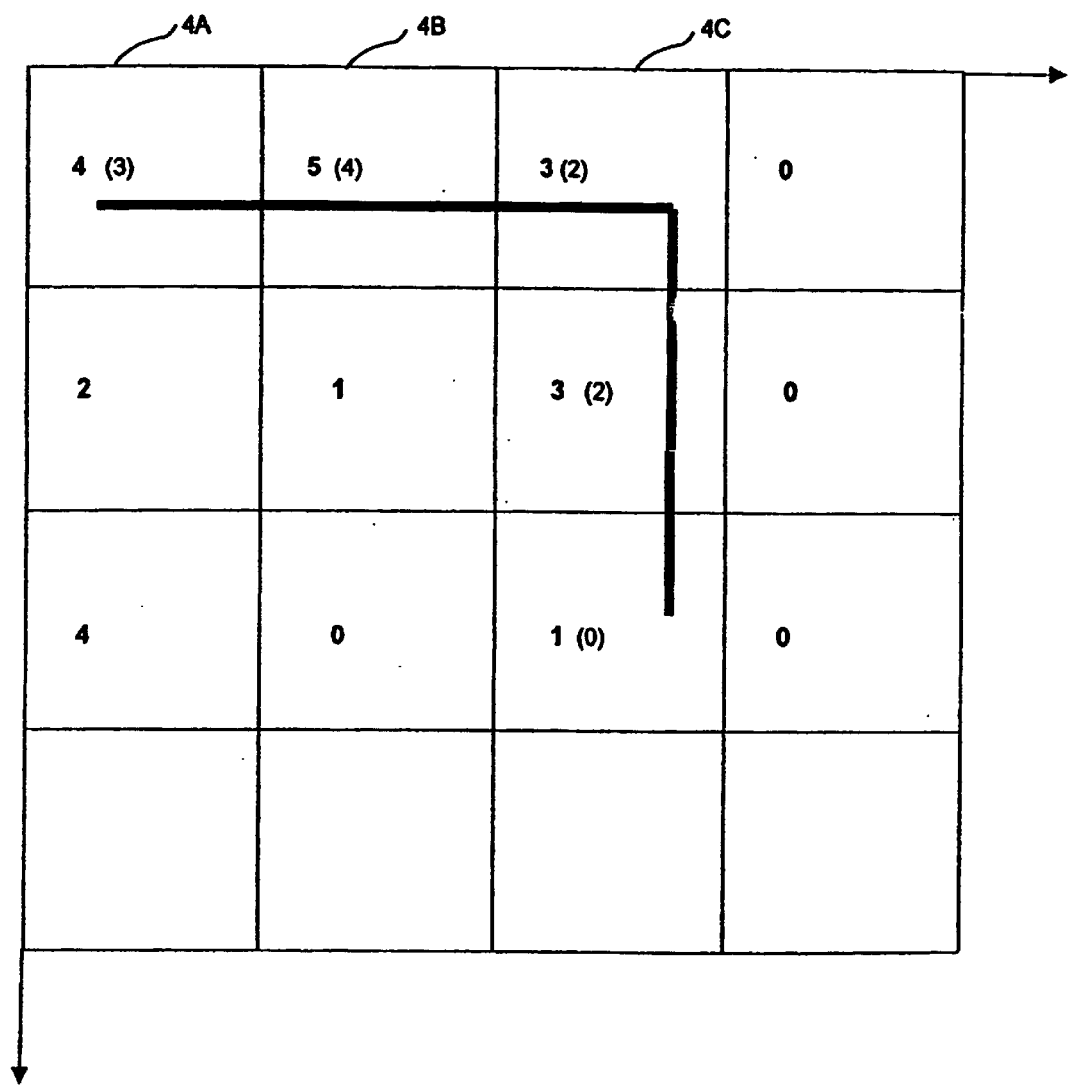
FIG. 6 shows an alternative arrangement of lines in an output image.
Figure 7:
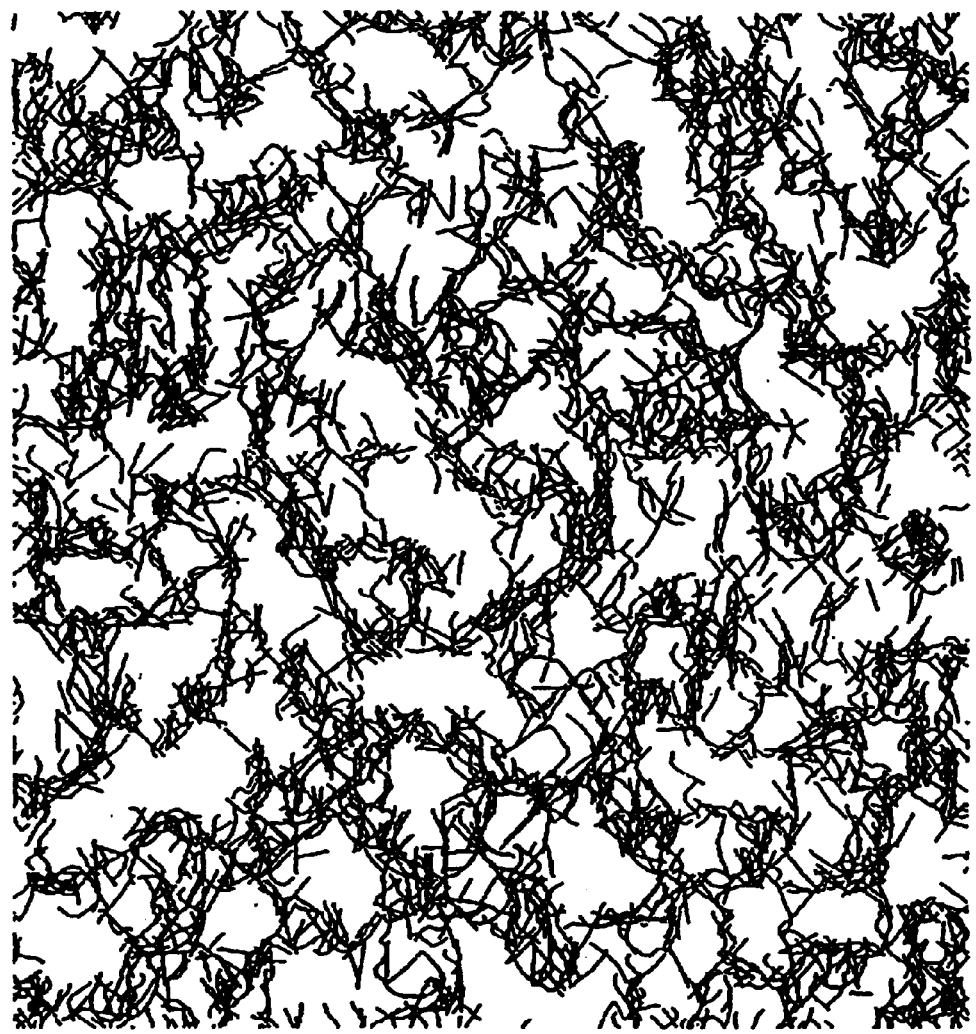
FIG. 7 is an overall diagram of an output image.

In accordance with one aspect, an embodiment of the invention is a substrate to which final user printing can later be applied to yield a final printed object. The substrate is characterized by having been processed prior to final user printing to yield a steganographic digital watermark pattern thereon. This pattern does not impair subsequent use of the substrate, yet conveys plural bits of digital information. The presence of such information is not apparent to a human observer of the substrate, but can be detected by visible-light scanning of the substrate to yield data from which the plural bit information can be recovered.

The steganographic digital watermark pattern can be formed by ink, which may be, e.g., speckled across at least part of the substrate. Or the ink can form a mesh of thin lines. (For example, the mesh can comprise a single pattern that is tiled across the substrate, with the pattern being arranged so that lines located at adjoining tile edges meet without discontinuity.) Such inking can serve to impart a colored tint to the substrate, and may be applied by known ink-jet printing processes.

The watermark pattern may also be defined by generating a tile specifying one of N luminance values for each of plural different areas, consolidating the N values down to M (where M<N), and then forming lines between such areas in response to the consolidated luminance values. The user may specify line criteria to be used, including whether the lines are straight or curved, and if curved parameters therefor.

The ink used in forming the watermark pattern can be of known types, including clear. The ink may be chosen to optimize watermark detection in the presence of expected illumination spectra, e.g., the illumination cast by a computer monitor.

In other embodiments the steganographic digital watermark pattern can be formed by texturing the substrate (e.g., by force of pressure, by embossing, by an intaglio plate, etc.).

In still other embodiments, the substrate can be processed to locally change its ink absorption ability.

In yet other embodiments, the substrate can include a photographic emulsion, and the watermark pattern can be formed by exposing the emulsion with a pattern (e.g., a noise-like pattern) and thereafter developing the emulsion to make the pattern detectable.

The pattern can be formed on the substrate prior to delivery of the substrate to an end user, e.g., by a producer or supplier of the substrate. Alternatively, the pattern can be formed on the substrate after such delivery.

In some embodiments, the digital watermark pattern may degrade when photocopied, so that the printed object can be distinguished from a photocopy. Such embodiments may also include a second digital watermark pattern—one that is robust against photocopying.

Depending on application, the digital watermark pattern may extend across an entire face of the substrate, or be restricted to certain areas. Likewise, only one side of the substrate—or both—can include watermark patterns. In substrates with laminate construction, the digital watermark pattern may be manifested in a laminate layer. In some embodiments, different regions of the substrate can convey different watermark payloads.

The plural bits of digital information represented by the watermark pattern can comprise an identifier that serves to convey information indicative of an electronic address. More particularly, the identifier can comprise a pointer into a remote data structure, with the remote data structure storing an electronic address corresponding to the substrate.

In some embodiments, the watermark pattern on the substrate may also convey a steganographic orientation signal.

To permit a document printed on such a substrate to be uniquely identified from other—seemingly identical—printed documents, the plural bits of digital information represented by the watermark can comprise serialization information. Alternatively, the digital information can serve to identify the type of substrate to a printer, so that the printer can tailor print parameters accordingly.

The watermark pattern may be formed on a side of the substrate opposite that to which final end-user printing is later applied.

Secret knowledge may be required to decode the plural bits of digital information from the substrate. Thus, a first end user cannot decode information encoded on a substrate of a second end user, and vice versa.

The substrate can take different forms, including an envelope, stationery, etc. The substrate can also comprise printing stock, such as for a security document (e.g., a banknote) or for newspapers and magazines. Or the substrate can comprise a printed check.

The summaries of the priority applications noted earlier are necessarily abbreviated and incomplete; the reader is referred to the cited applications for their full disclosures. Moreover, the disclosures discussed in connection with one application or technology may have antecedents in earlier applications. Again, the reader is referred to the cited applications.

Certain of the cited applications note that document identification technologies other than digital watermarking (e.g., bar codes, RFIDs, etc.) can be used in certain circumstances.

The above-referenced patents and patent applications are incorporated herein as if set forth in their entireties.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof. (Claims follow appendices.)

We claim:

1. A substrate to which final user printing can be later applied to yield a final printed object, characterized in that the substrate has been processed prior to final user printing to yield a steganographic digital watermark pattern thereon that does not impair subsequent use of the substrate, yet encodes multi-bit binary data, the presence of said multi-bit binary data not being apparent to a human observer of the substrate, said steganographic pattern being detectable by visible-light scanning of the substrate to yield data from which the multi-bit binary data can be recovered.

2. The substrate of claim 1 in which the substrate has been processed with ink to form the steganographic digital watermark pattern thereon.

3. The substrate of claim 2 in which the ink is clear ink.

4. The substrate of claim 2 in which the ink is speckled across at least a part of the substrate.

5. The substrate of claim 1 in which the substrate has been textured to form the steganographic digital watermark pattern thereon.

6. The substrate of claim 1 in which the digital watermark pattern extends across an entire face of the substrate.

7. The substrate of claim 1 in which the digital watermark pattern is restricted to certain areas of said substrate.

8. The substrate of claim 1 in which the substrate has first and second sides, and only the first side has a watermark pattern.

9. The substrate of claim 1 in which the substrate has first and second sides, and both sides have watermark patterns.

10. The substrate of claim 1 in which the digital watermark pattern is manifested in a laminate layer.

11. The substrate of claim 1 in which said multi-bit binary data comprise an identifier, said identifier serving to convey information indicative of an electronic address.

12. The substrate of claim 11 in which the identifier comprises a pointer into a remote data structure, the remote data structure storing an electronic address corresponding to said substrate.

13. The substrate of claim 1 in which the watermark pattern conveys a steganographic orientation signal.

14. The substrate of claim 1 in which the multi-bit binary data comprise serialization information, permitting the printed object to be uniquely identified from other, seemingly identical, printed objects.

15. The substrate of claim 1 in which the watermark pattern is formed on a side of said substrate opposite a side to which final end-user printing is later applied.

16. The substrate of claim 1 comprising printing stock for a security document such as a banknote.

17. The substrate of claim 1 comprising a printed check.

18. The substrate of claim 1 wherein said multi-bit binary data correspond to said pattern in accordance with an algorithmic transformation.

19. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the substrate has been processed with ink to form the steganographic digital watermark pattern thereon, and the ink forms a mesh of thin lines.

20. The substrate of claim 19 in which the mesh of thin lines comprise a single pattern that is tiled across the substrate, the pattern being arranged so that lines located at adjoining tile edges meet without discontinuity.

21. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the substrate has been processed with ink to form the steganographic digital watermark pattern thereon, and the ink serves to impart a colored tint to the substrate.

22. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein said processing locally changes an ink absorption attribute of the substrate.

23. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the digital watermark pattern degrades when photocopied, so that the printed object can be distinguished from a photocopy thereof.

24. The substrate of claim 23 comprising a second digital watermark pattern, the second pattern being robust against photocopying.

25. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein a first region of the substrate conveys a first watermark payload, and a second, different region of the substrate conveys a second, different watermark payload.

26. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the plural bits of digital information serve to identify the type of substrate to a printer, so that the printer can tailor print parameters accordingly.

27. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the plural bits of digital information can be decoded from said substrate only by a user having secret knowledge, wherein a first end user cannot decode information encoded on a substrate of a second end user, and vice versa.

28. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the substrate comprises an envelope.

29. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the substrate comprises stationery.

30. A substrate to which final user printing can be later applied to yield a final printed object, characterized in that the substrate has been processed prior to final user printing to yield a steganographic digital watermark pattern thereon that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the substrate comprises blank magazine or newspaper printing stock.

31. A method of processing a blank substrate prior to final printing by an end-user, the method comprising forming a steganographic digital watermark pattern on the substrate that does not impair subsequent use of the substrate, yet encodes multi-bit binary data, the presence of said multi-bit binary data not being apparent to a human observer of the substrate, said steganographic pattern being detectable by visible-light scanning of the substrate to yield data from which the multi-bit binary data can be recovered.

32. The method of claim 31 that includes forming said pattern by applying ink to the substrate.

33. The method of claim 32 that includes forming said pattern by ink-jet printing.

34. The method of claim 31 that includes forming said pattern by texturing the substrate.

35. The method of claim 34 in which the texture is applied by force of pressure.

36. The method of claim 34 in which the texture is formed by embossing.

37. The method of claim 34 in which the texture is formed by an intaglio plate.

38. The method of claim 31 in which the watermark pattern conveys a steganographic orientation signal.

39. The method of claim 31 in which the pattern is formed on the substrate after delivery of the substrate to the end-user, rather than previously—as by a producer or supplier of said substrate.

40. The method of claim 31 in which the pattern is formed on the substrate prior to delivery of the substrate to the end user—as by a producer or supplier of said substrate, rather than after.

41. The method of claim 31 in which the pattern is formed of ink, and the ink is chosen to optimize watermark detection in the presence of expected illumination spectra.

42. The method of claim 31 in which the watermark pattern is formed on a side of said substrate opposite a side to which final end-user printing is later applied.

43. A blank substrate produced according to the method of claim 31.

44. The method of claim 31 wherein said multi-bit binary data correspond to said pattern in accordance with an algorithmic transformation.

45. A method of processing a blank substrate prior to final printing by an end-user, the method comprising forming a steganographic digital watermark pattern on the substrate that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the digital watermark pattern is designed to degrade when photocopied, so that the original printed substrate can be distinguished from a photocopy thereof.

46. A method of processing a blank substrate prior to final printing by an end-user, the method comprising forming a steganographic digital watermark pattern on the substrate that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the method further includes passing the processed substrate through a printer for end-user printing, recognizing the pattern thereon, and tailoring a printing parameter accordingly.

47. A method of processing a blank substrate prior to final printing by an end-user, the method comprising forming a steganographic digital watermark pattern on the substrate that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered, wherein:

the substrate has a photographic emulsion thereon;

the pattern is formed by exposing the emulsion with a noise-like pattern; and the pattern is detectable after developing of the substrate.

48. A method of processing a blank substrate prior to final printing by an end-user, the method comprising forming a steganographic digital watermark pattern on the substrate that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the pattern is defined by generating a tile specifying one of N luminance values for each of plural different areas, consolidating the N values down to M, where M is less than N, and then forming lines between said areas in response to said consolidated luminance values.

49. The method of claim 48 that further includes allowing a user to specify line criteria, including whether the lines are straight or curved, and if curved, the criteria therefore.

50. A method of processing a blank substrate prior to final printing by an end-user, the method comprising forming a steganographic digital watermark pattern on the substrate that does not impair subsequent use of the substrate, yet conveys plural bits of digital information, the presence of said information not being apparent to a human observer of the substrate, said steganographic pattern being detectable by visible-light scanning of the substrate to yield data from which the plural bit information can be recovered; wherein the plural bits of digital information can be decoded from said substrate only by a user having secret knowledge, wherein a first end user cannot decode information encoded on a substrate of a second end user, and vice versa.

* * * * *

UNITED STATES PATENT AND TRADEMARK OFFICE
CERTIFICATE OF CORRECTION

| | | |
|---|---|---|
| PATENT NO. | : 6,985,600 B2 | |
| APPLICATION NO. | : 09/811366 | |
| DATED | : January 10, 2006 | |
| INVENTOR(S) | : Geoffrey B. Rhoads, Tony F. Rodriguez and J. Scott Carr | |

It is certified that error appears in the above-identified patent and that said Letters Patent is hereby corrected as shown below:

Title page, item (75) delete inventors "Aruna B. Kumar, Trent J. Brundage, Brett T. Hannigan," leaving --Geoffrey B. Rhoads, Tony F. Rodriguez, J. Scott Carr--.

Title page, item (63), under Related U.S. Application Data, delete entire paragraph from "Continuation-in-part of application No. 09/803,167, through ... March 17, 1994, now abandoned."

Title page, item (63), under Related U.S. Application Data, insert the following:
--Continuation-in-part of 09/127,502, filed on Jul. 31, 1998, now Pat. No. 6,345,104, which is a continuation-in-part of 08/967,693, filed Nov. 12, 1997, now Pat. No. 6,122,392, which is a continuation of 08/614,521, filed Mar. 15, 1996, now Pat. No. 5,745,604, which is a continuation of 08/215,289, filed Mar. 17, 1994, now abandoned; and a continuation-in-part of 09/498,223, filed Feb. 3,2000, now Pat. No. 6,574,350, which is a continuation-in-part of 09/287,940, filed Apr. 7, 1999, now Pat. No. 6,580,819. (Application 09/498,223, also is a continuation-in-part of 09/433,104, filed Nov. 3, 1999, now Pat. No. 6,636,615, which is a continuation-in-part of 09/234,780, filed Jan. 20, 1999, now abandoned); and a continuation-in-part of 09/553,112, filed Apr. 20, 2000, now abandoned; and a continuation-in-part of application 09/562,516, filed May 1, 2000; and a continuation-in-part of application 09/562,524, filed May 1, 2000, now Pat. No. 6,724,912; and a continuation-in-part of application 09/571,422, filed May 15, 2000; and a continuation-in-part of application 09/619,264, filed Jul. 19, 2000; and a continuation-in-part of application 09/629,401, filed Aug. 1, 2000, now Pat. No. 6,522,770; and a continuation-in-part of application 09/631,409, filed Aug. 3, 2000; and a continuation-in-part of application 09/633,587, filed Aug. 7, 2000, which is a continuation-in-part of application 09/343,104, filed Jun. 29, 1999, now abandoned, which is a continuation-in-part of application 09/314,648, filed May 19, 1999, now Pat. No. 6,681,028; and a continuation-in-part of application 09/640,806, filed Aug. 17, 2000, now Pat. No. 6,438,231; and a continuation-in-part of application 09/689,289, filed Oct. 11, 2000, which is a continuation-in-part of application 09/567,405, filed May 8, 2000; and a continuation-in-part of application 09/803,167, filed Mar. 9, 2001.

Column 1, line 41, after "(abandoned" insert --in favor of continuation application 10/765,430--.

UNITED STATES PATENT AND TRADEMARK OFFICE
CERTIFICATE OF CORRECTION

PATENT NO. : 6,985,600 B2
APPLICATION NO. : 09/811366
DATED : January 10, 2006
INVENTOR(S) : Geoffrey B. Rhoads, Tony F. Rodriguez and J. Scott Carr It is certified that error appears in the above-identified patent and that said Letters Patent is hereby corrected as shown below:

Column 2, line 19, change "information applica-" to --information. Applica- --.

Column 3, line 19, change "Application" to --Applications--.

Column 6, line 43, after "appendices.)" insert appendices D-K as attached to Certificate of Correction. (See the amendment and substitute specification mailed to the Patent Office on April 21, 2004.)

Column 7, lines 4 and 5, delete claim 9.

Column 7, lines 8-10, delete claim 11.

Column 7, lines 11-14, delete claim 12.

Column 7, lines 21-23, delete claim 15.

Column 7, line 26, delete claim 17.

Column 7, line 60 through column 8, line 4, delete claim 22.

Column 8, lines 5-17, delete claim 23.

Column 8, lines 18-20, delete claim 24.

Column 8, lines 21-33, delete claim 25.

Column 8, lines 34-46, delete claim 26.

Column 8, line 61, through Column 9, line 4, delete claim 28.

Column 9, lines 5-14, delete claim 29.

Column 9, lines 15-25, delete claim 30.

Column 9, lines 58-60, delete claim 42.

UNITED STATES PATENT AND TRADEMARK OFFICE
CERTIFICATE OF CORRECTION

| | | |
|---|---|---|
| PATENT NO. | : 6,985,600 B2 | |
| APPLICATION NO. | : 09/811366 | |
| DATED | : January 10, 2006 | |
| INVENTOR(S) | : Geoffrey B. Rhoads, Tony F. Rodriguez and J. Scott Carr | |

It is certified that error appears in the above-identified patent and that said Letters Patent is hereby corrected as shown below:

Column 9, line 66 through Column 10, line 10 delete claim 45.

Column 10, lines 11-23, delete claim 46.

Signed and Sealed this

Fifth Day of February, 2008

JON W. DUDAS
*Director of the United States Patent and Trademark Office*